United States Patent [10] Patent No.: US 12,045,533 B2
Rangwala et al. [45] Date of Patent: Jul. 23, 2024

(54) CONTENT SHARING WITH SPATIAL-REGION SPECIFIC CONTROLS TO FACILITATE INDIVIDUALIZED PRESENTATIONS IN A MULTI-VIEWER SESSION

(71) Applicant: Capital One Services, LLC, McLean, VA (US)

(72) Inventors: Jignesh Rangwala, Glen Allen, VA (US); Lee Adcock, Midlothian, VA (US); Mehulkumar Jayantilal Garnara, Glen Allen, VA (US); Vamsi Kavuri, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/969,492

(22) Filed: Oct. 19, 2022

(65) Prior Publication Data
US 2024/0134590 A1 Apr. 25, 2024

(51) Int. Cl.
*G06F 3/14* (2006.01)
*G06F 3/0486* (2013.01)
*H04N 7/14* (2006.01)
*H04N 7/15* (2006.01)

(52) U.S. Cl.
CPC .......... *G06F 3/1454* (2013.01); *G06F 3/0486* (2013.01); *H04N 7/147* (2013.01); *H04N 7/152* (2013.01)

(58) Field of Classification Search
CPC ..... G06F 3/1454; G06F 3/0486; H04N 7/147; H04N 7/152
See application file for complete search history.

(56) References Cited

U.S. PATENT DOCUMENTS

| | | | |
|---|---|---|---|
| 7,424,543 B2 * | 9/2008 | Rice, III | G06F 16/182 715/744 |
| 10,083,617 B2 * | 9/2018 | Yang | G06F 3/0488 |
| 10,976,984 B2 * | 4/2021 | Feldman | H04L 65/611 |
| 11,360,732 B1 * | 6/2022 | Dagani | G09G 5/14 |
| 11,366,629 B2 * | 6/2022 | Wang | G06F 3/1454 |
| 11,734,581 B1 * | 8/2023 | Badr | G06F 9/54 719/328 |
| 2002/0042814 A1 * | 4/2002 | Fukasawa | H04L 12/1813 709/204 |
| 2007/0260684 A1 * | 11/2007 | Sharma | H04L 12/1818 709/204 |

(Continued)

*Primary Examiner* — Kenny Nguyen
(74) *Attorney, Agent, or Firm* — Perkins Coie LLP

(57) ABSTRACT

In some embodiments, a shared presentation, which includes a set of spatial regions, is transmitted to user devices associated with users. Then, based on a user input indicating a first spatial region of the shared presentation for a first user, first auxiliary data (e.g., auxiliary video stream of the shared presentation) that corresponds to the first spatial region is generated. Moreover, based on the user input indicating the first user, a first user device associated with the first user is caused to display the first spatial region at a first time without displaying one or more other spatial regions of the set of spatial regions at the first time. As an example, the first auxiliary data is transmitted to the first user device, which causes the first user device to display the first spatial region without displaying the other spatial regions.

20 Claims, 6 Drawing Sheets

(56) References Cited

U.S. PATENT DOCUMENTS

| | | | |
|---|---|---|---|
| 2011/0239133 A1* | 9/2011 | Duffus | G06F 9/461 |
| | | | 715/753 |
| 2012/0030594 A1* | 2/2012 | Yokoyama | G06F 3/1454 |
| | | | 715/765 |
| 2015/0296176 A1* | 10/2015 | Kato | H04N 7/15 |
| | | | 348/14.08 |
| 2019/0081993 A1* | 3/2019 | Shim | H04L 65/4015 |
| 2020/0065053 A1* | 2/2020 | Wang | G09G 5/14 |
| 2020/0065521 A1* | 2/2020 | Durvasula | H04L 63/0421 |
| 2020/0201591 A1* | 6/2020 | Feldman | H04N 7/15 |
| 2021/0224021 A1* | 7/2021 | Feldman | H04L 65/611 |
| 2021/0397402 A1* | 12/2021 | Ashkenazi | G09G 5/14 |
| 2022/0335155 A1* | 10/2022 | Zimmer | G06N 20/00 |
| 2022/0374585 A1* | 11/2022 | Wang | G11B 27/031 |
| 2023/0041287 A1* | 2/2023 | Tian | G06F 9/452 |
| 2023/0126561 A1* | 4/2023 | Gerrese | G08G 1/202 |
| | | | 701/23 |

* cited by examiner

CONTENT SHARING WITH SPATIAL-REGION SPECIFIC CONTROLS TO FACILITATE INDIVIDUALIZED PRESENTATIONS IN A MULTI-VIEWER SESSION

BACKGROUND

Multiple participants in a video conference typically see the same content shared by the presenter. Although an individual participant can self-select portions of the shared content presentation to view (e.g., the participant can zoom in or out on the participant's window on which the shared content is being presented to the participant), existing systems generally are not configured to enable a presenter or controlling user to specifically direct a viewer device of a viewer to a given portion of the shared content presentation without also directing the viewer devices of all other viewers to the same content portion.

SUMMARY

Methods and systems are described herein for providing content sharing with spatial-region specific controls, for example, in a manner that enables a presenter or other controlling user to individualize a presentation to a given viewer in a multi-viewer session (e.g., without affecting the content being shared to one or more other viewers in the same presentation session). As one example, methods and systems are described herein for displaying different portions of the presentation screen to one or more different viewing users.

As discussed, although an individual participant can self-select portions of a shared content presentation to view, existing systems generally do not enable a presenter or controlling user to specifically direct a viewer device of a viewer to a given portion of the shared content presentation without also directing the viewer devices of all other viewers to the same content portion. For example, in order to provide different viewing users with different content, existing systems must typically establish separate presentation sessions for the different users in a manner that required a presenting user to manage each of the different presentation sessions while also isolating the viewing users from each other.

To overcome these technical issues, methods and systems disclosed herein provide content sharing with spatial-region specific controls in a manner that enables a presenter or other controlling user to individualize a presentation to a given viewer in a multi-viewer session. For example, in instances where such a presenting/controlling user wants to direct a first spatial region (of a set of spatial regions of a presentation shared to multiple users) to a first user device of a first user (also referred to as a first viewing user in this document), some embodiments involve: (i) obtaining a user input indicating the first spatial region for the first user; (ii) generating, based on the user input indicating the first spatial region, first auxiliary data for the shared presentation that corresponds to the first spatial region; and (iii) causing, based on the user input indicating the first user, a first user device associated with the first user to display the first spatial region at a first time (e.g., without displaying one or more other spatial regions of the set of spatial regions at the first time). In one scenario, the first auxiliary data may be transmitted to the first user device to cause the first user device to display the first spatial region at the first time. In another scenario, the first auxiliary data may include an auxiliary presentation stream of the shared presentation that corresponds to the first spatial region, and the first user device may display the auxiliary presentation stream in lieu of displaying a common video stream actively being viewed by the other users. In this way, for example, the presenting/controlling user may individualize the presentation for the first user (by providing a user input indicating the first user and the spatial region of the shared presentation pertinent to the first user) without necessarily requiring all other users to divert their attention from one or more other spatial regions of the shared presentation.

As another example, some embodiments enable the presenting user to leverage the drag-and-drop feature to intuitively select which portions of a presentation shared to multiple viewing users (e.g., an entire screen of the presenting user) should be provided to which viewing users and create customized auxiliary streams that can be provided to the respective viewing users. In one use case, for example, during a video conference call, a system transmits a primary video stream of a shared presentation of a presenting device associated with a presenting user to viewing devices associated with viewing users (e.g., such that each of the viewing devices is caused to display a set of spatial video regions that collectively form the shared presentation). The system then obtains, from the presenting device, a drag-and-drop input that corresponds to the presenting user moving a first viewing user icon (representing a first viewing user) onto a first spatial video region of the set of spatial video regions of the shared presentation. Based on the drag-and-drop input indicating the first spatial video region and indicating the first viewing user, the system generates a first auxiliary video stream of the shared presentation that corresponds to the first spatial video region (e.g., such that the first auxiliary video stream does not include other video spatial regions of the set of spatial video regions) and causes, during the video conference call, a first viewing device associated with the first viewing user to display the first auxiliary video stream (e.g., in lieu of displaying the primary video stream) by transmitting the first auxiliary video stream to the first viewing device such that (i) the first viewing device displays the first spatial video region at a first time (e.g., without displaying the other video spatial regions at the first time) and (ii) one or more other viewing devices simultaneously display the first spatial video region and the other video spatial regions at the first time.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
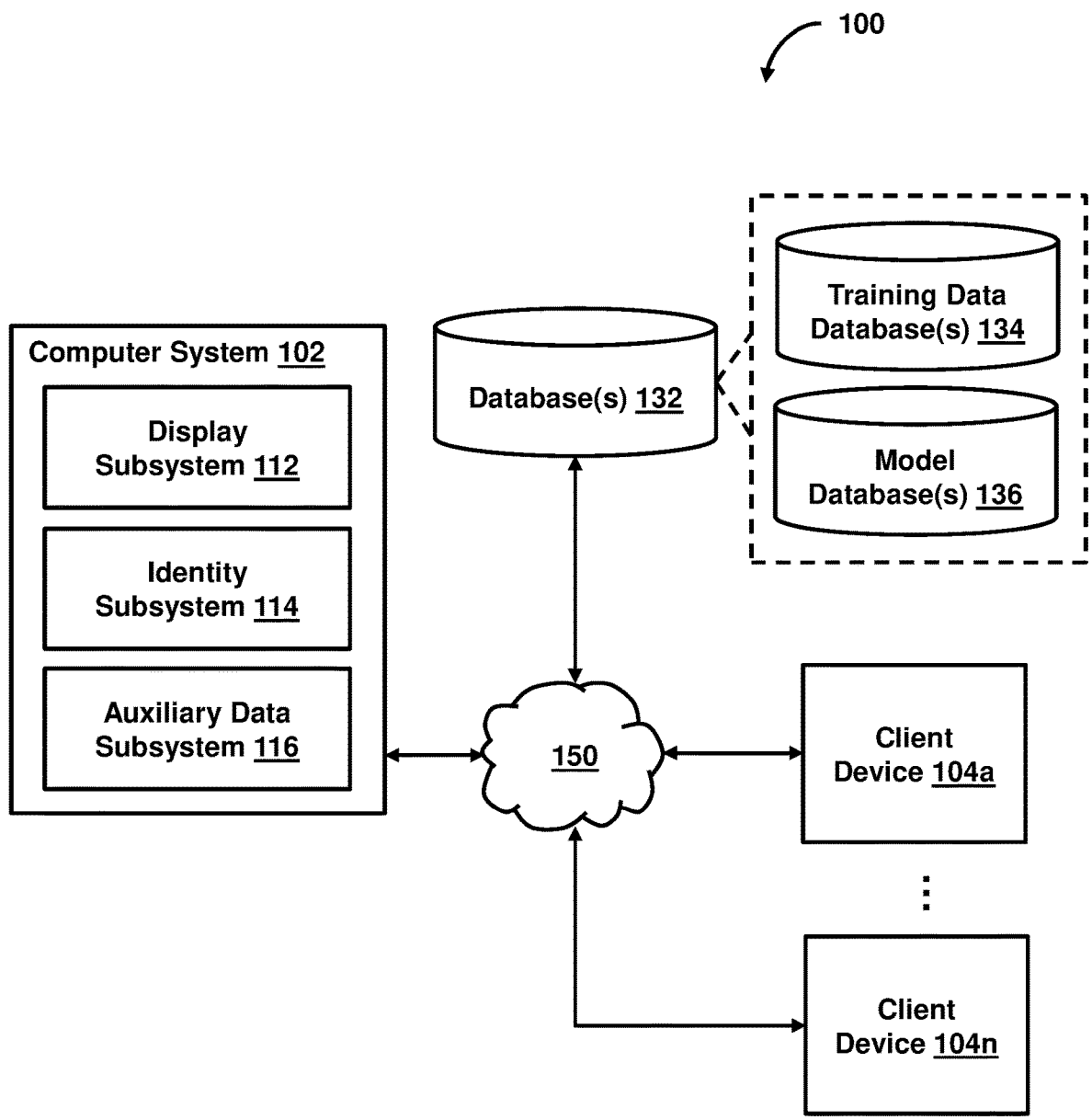
FIG. 1 shows a system for providing customized views of a presentation screen to one or more users in a multi-viewer session, in accordance with one or more embodiments.

FIG. 1 shows a system 100 for providing customized views of a presentation screen to one or more users in a multi-viewer session, in accordance with one or more embodiments. As shown in FIG. 1, system 100 may include computer system 102, client device 104 (or client devices 104a-104n), or other components. Computer system 102 may include display subsystem 112, identity subsystem 114, auxiliary data subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 includes a presenting user device (e.g., computer system 102) and one or more user devices associated with users (e.g., client devices 104a-104n). In an example, the system 100 transmits the shared presentation to the user devices (alternatively referred to as viewing user devices) via a network (e.g., network 150). In an example, each screen (or frame) of the shared presentation is formed by a set of spatial regions that are non-overlapping. In another example, the set of spatial regions may be partially overlapping. The system 100 is configured to receive a user input indicating a spatial region of the set of spatial regions for a first user (e.g., client device 104a) of the users. Based on the user input that was received, the system 100 generates auxiliary data for the shared presentation corresponding to the spatial region that was indicated. The generated auxiliary data is transmitted to the first user, and the first user device is configured to display only the indicated spatial region without displaying the other spatial regions. This advantageously enables the first user to focus on the indicated spatial region that was selected by system 100, and not be distracted by the other spatial regions that are not pertinent to the first user.

In some embodiments, the system 100 transmits, during a video conference call, a primary video stream of a shared presentation to viewing devices associated with viewing users (e.g., such that each of the viewing devices is caused to display a set of spatial video regions that collectively form each frame of the shared presentation). The system 100 obtains, from the presenting device, a drag-and-drop input corresponding to the presenting user moving a first viewing user icon representing a first viewing user onto a first spatial video region of the set of spatial video regions of the shared presentation. Next, based on the drag-and-drop input indicating the first spatial video region, the system 100 generates a first auxiliary video stream of the shared presentation that corresponds to the first spatial video region such that the first auxiliary video stream does not include other video spatial regions of the set of spatial video regions. Finally, the system 100 causes, during the video conference call, based on the drag-and-drop input indicating the first viewing user, a first viewing device associated with the first viewing user to display the first auxiliary video stream in lieu of displaying the primary video stream by transmitting the first auxiliary video stream to the first viewing device. In one use case, for example, by doing so, the first viewing device displays the first spatial video region without displaying the other video spatial regions, while one or more other viewing devices simultaneously display the first spatial video region and the other video spatial regions.

Subsystems 112-116

In some embodiments, display subsystem 112 may be configured to partition the screen (or equivalently, each frame of the presentation) into one or more spatial regions. As an example, the set of spatial regions may be non-overlapping. As another example, the set of spatial regions may be partially overlapping. Display subsystem 112 may be further configured to receive input or instructions from the presenting user, and partition the screen into the spatial regions based on the received input or instructions. Alternatively, display subsystem 112 may be further configured to create the spatial regions based on artificial intelligence models. In an example, these artificial intelligence models may be both trained and configured to perform inference based on data in databases 132 that can be accessed through the network (e.g., network 150). The databases 132 may include a training data database 134 for the training phase of the artificial intelligence model and a model database 136 for its inference phase.

Figure 2:
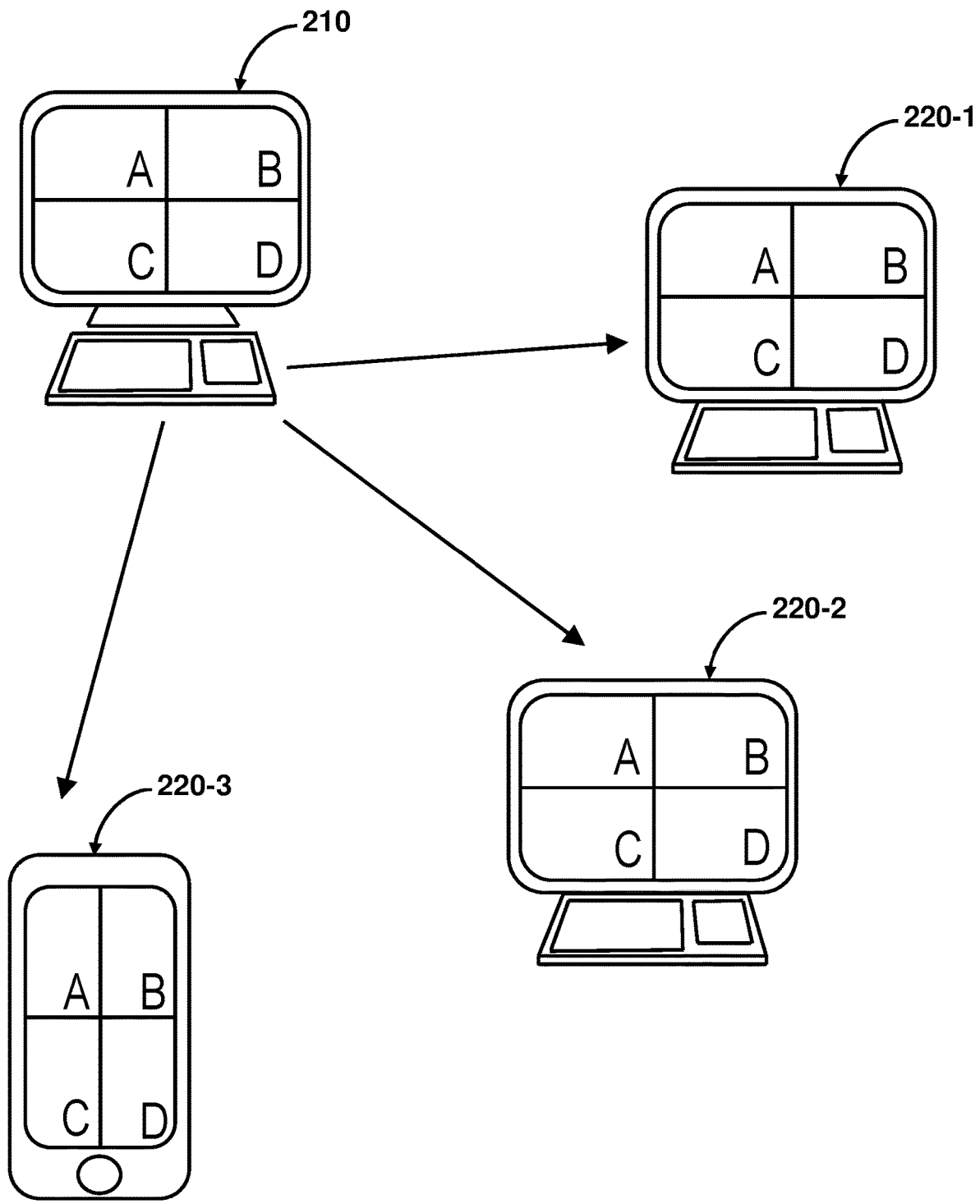
FIG. 2 shows an illustrative diagram of sharing an entire presentation screen with multiple viewing users, in accordance with one or more embodiments.

In one scenario, with respect to FIG. 2, display subsystem 112 partitions the screen of the presenting user device 210 into four non-overlapping spatial regions (denoted "A", "B", "C", "D"), which are transmitted to viewing user devices (220-1, 220-2, 220-3). The viewing user devices need not necessarily be of the same type. As seen in FIG. 2, viewing user device 220-3 is a cellphone with a significantly smaller screen than view user devices 220-1 and 220-2, which are desktop computers. For example, the scenario in FIG. 2 may correspond to transmitting, during a video conference call, a primary video stream of a shared presentation of a presenting device (210) associated with a presenting user to viewing devices (220-1, 220-2, 220-3) associated with viewing users such that each of the viewing devices is caused to display a set of spatial video regions ("A", "B", "C", "D") that collectively form the shared presentation.

In some embodiments, identity subsystem 114 may be configured to provide identifying information for each of the viewing users (e.g., client devices 104a-104n) to the presenting user. The presenting user can use this information to generate the input or instructions that are used by display subsystem 112 to create the spatial regions. As an example, identity subsystem 114 may provide a representation for each client device. The presenting user can use a drag-and-drop feature to move the representation of a particular viewing user into the spatial region that the presenting user would like that particular viewing user to see. The representation may be an icon, an email address, a username, a company profile, and the like.

Figure 3:
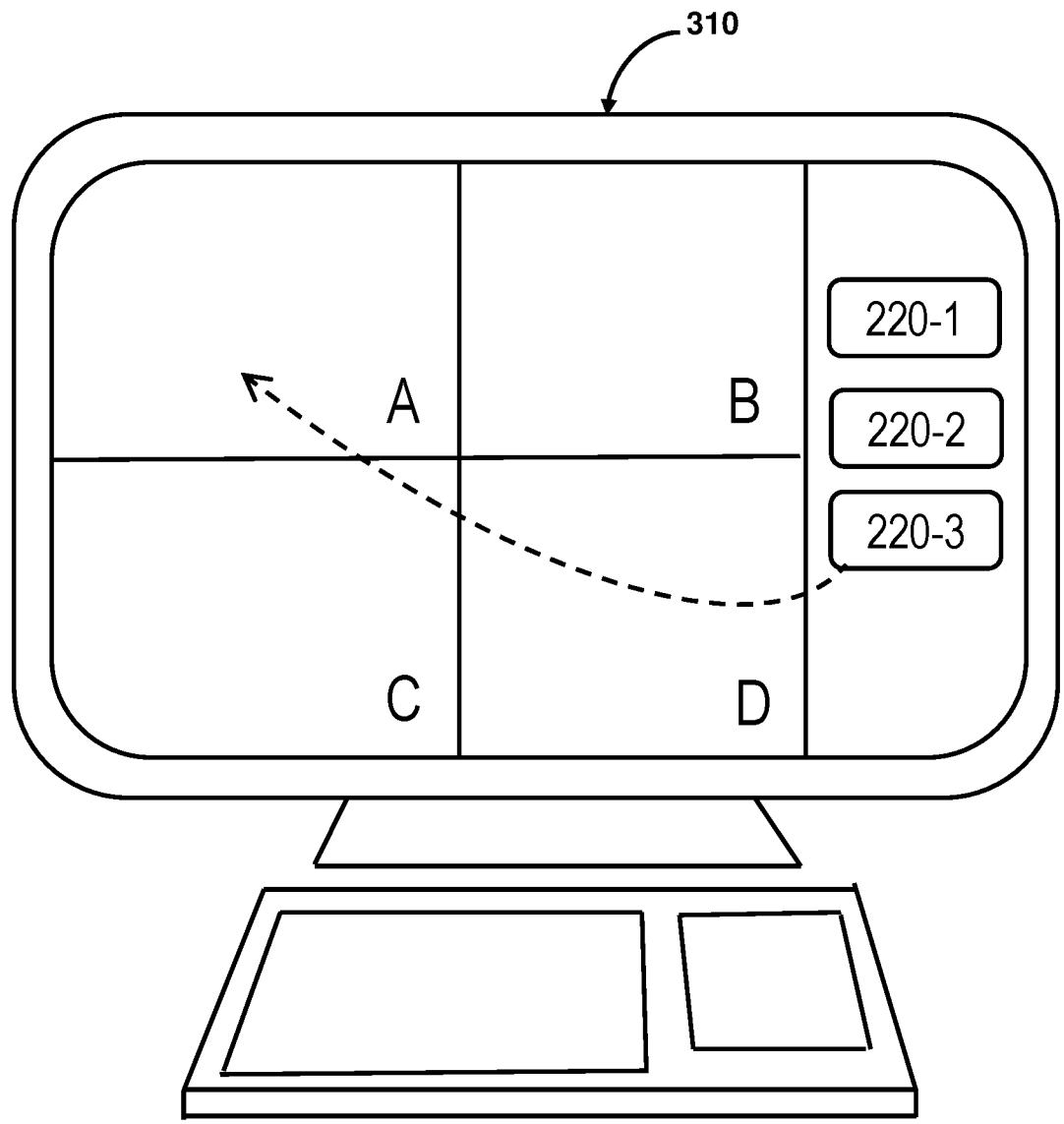
FIG. 3 shows an illustrative diagram of sharing portions of an entire presentation screen to one or more users in a multi-viewer session, in accordance with one or more embodiments.

In another scenario, with respect to FIG. 3, identity subsystem 114 provides identifying information for each of the viewing user devices (e.g., 220-1, 220-2, 220-3 in FIG. 2) on a portion of the screen of the presenting user device (210 in FIG. 2, 310 in FIG. 3). As an example, the portion of the screen with the identifying information may be visible to the presenting user concurrently with the set of spatial regions (as shown in FIG. 3). Alternatively, the portion of the screen with identifying information may be a translucent (or semi-transparent) overlay on the set of spatial regions. For example, the scenario in FIG. 3 may correspond to obtaining, from the presenting device, a drag-and-drop input (represented by dashed arrow in FIG. 3) corresponding to the presenting user moving a first viewing user icon representing a first viewing user onto a first spatial video region of the set of spatial video regions of the shared presentation.

In a further scenario, prior to transmitting an auxiliary video stream to a viewing user device, identity subsystem 114 identifies personally identifiable information in the indicated spatial region and redacts that information. Only after the personally identifiable information has been obscured or removed by identity subsystem 114, does the presenting user device create the auxiliary video stream. For example, personally identifiable information includes one or more of name, address, email, telephone number, date of birth, passport number, fingerprint, driver's license number, credit or debit card number, and/or social security number, and the like. This functionality advantageously ensures that a required level of privacy can be maintained when using the described embodiments.

In some embodiments, auxiliary data subsystem 116 may be configured to generate an auxiliary video stream (or other auxiliary data) that includes the data corresponding to the spatial region that was indicated by identity subsystem 114. As an example, the auxiliary video stream may be generated in the same format (e.g., MPEG® or Matroska®) as the original video stream that corresponded to the entire screen and included all the spatial regions. This formatting enables the same resources to be used to transmit the auxiliary video stream that were used for the original video stream. As another example, the auxiliary video stream may be generated in a format that is different from the format of the original video stream (e.g., the spatial region may only include code which need not be transmitted in a traditional video format). This formatting enables different, and likely fewer (e.g., if the auxiliary stream can be compressed more), resources to be used to transmit the auxiliary stream. In some embodiments, the auxiliary video stream may be transmitted in lieu of transmitting the entirety of the original video stream. As such, for example, where the auxiliary video stream only includes a portion of the original data, transmitting such portion without transmitting one or more other portions of the original data saves network bandwidth from unnecessarily being used.

Figure 4:
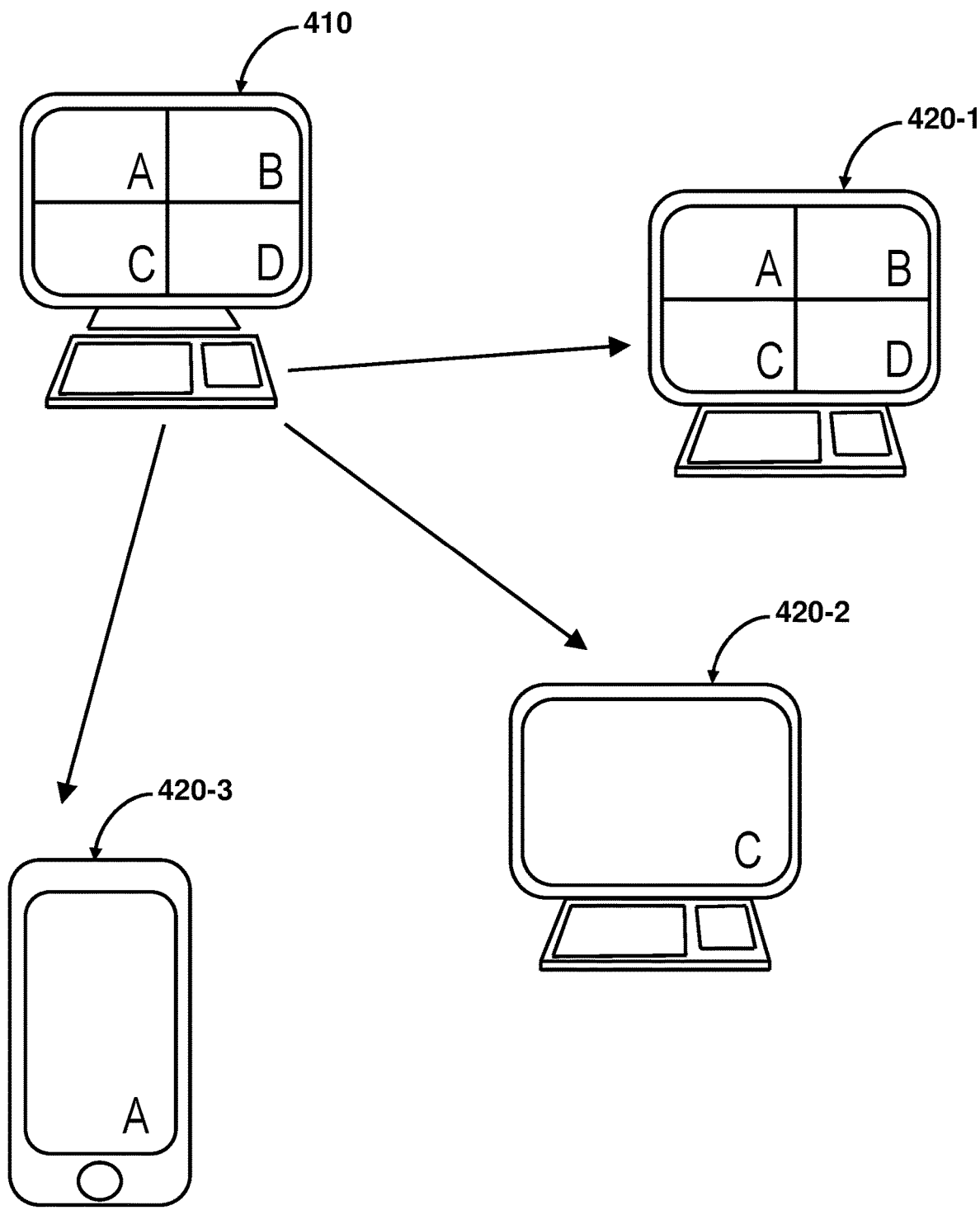
FIG. 4 shows an illustrative diagram of selecting a viewing user to enable a customized presentation screen, in accordance with one or more embodiments.

In a further scenario, with respect to FIG. 4, auxiliary subsystem 116 creates an auxiliary video stream for one or more of the viewing user devices. As shown therein, a first auxiliary video stream corresponding to spatial region "A" is created for viewing user device 420-3 and a second auxiliary video stream corresponding to spatial region "C" is created for view user device 420-2. For example, the scenario in FIG. 4 may correspond to generating, based on the drag-and-drop input indicating the first spatial video region (as shown in FIG. 3), a first auxiliary video stream of the shared presentation that corresponds to the first spatial video region such that the first auxiliary video stream does not include other video spatial regions of the set of spatial video regions.

For example, if the same spatial region is to be transmitted to more than one viewing user device, auxiliary subsystem 116 creates a single auxiliary stream that is transmitted to two or more viewing user devices. As another example, based on information provided by identity subsystem 114, two different auxiliary stream may be created for the same spatial region to ensure that each of the two or more viewing user devices receives content that enhances the user experience (e.g., a viewing user device that is a mobile phone will receive an auxiliary stream that is different than the one transmitted to another viewing user device that is a desktop computer).

In some embodiments, the presenting user may want to share two different spatial regions (e.g., spatial regions "A" and "C" as shown in FIG. 2) with a first viewing user (or more generally, with one or more other users). In this example, with respect to FIG. 3, the presenting user may drag-and-drop the first viewing user icon onto region "A" and then again onto region "C" while holding down the "Shift" or "Ctrl" key, which indicates that multiple regions are to be shared with the first viewing user. Herein, auxiliary data subsystem 116 may be configured to generate two separate auxiliary video streams (a first for spatial region "A" and a second for spatial region "B"), which are then transmitted to the first viewing user. Alternatively, auxiliary data subsystem 116 may be configured to generate a single auxiliary video stream that encodes both spatial regions "A" and "C." The system then causes the first viewing user device to display both the first spatial region "A" and the second spatial region "C" in lieu of displaying the entire shared presentation. In an example, the first viewing user device may display these two regions in a tiled configuration. In another example, the two regions may be displayed in a cascaded configuration.

Without loss of generality, more than two spatial regions from a shared presentation that includes multiple spatial regions (and not just four, as shown in FIGS. 2-4) can be shared by a presenting user to one or more viewing user devices based on the described embodiments.

In some embodiments, auxiliary subsystem 116 transmits decoding instructions to one or more viewing user devices, which instructs those viewing user devices to only decode the portion of the original screen that was identified by the identity subsystem 114 (or otherwise not decode one or more other portions of the original screen). In this scenario, an encoded video stream (e.g., encoded using H.264 or H.266)

corresponding to the entire presentation screen is transmitted to all viewing user devices, but the selected/indicated users may only decode a portion of that encoded video stream, thereby saving processing resources at the viewing user device (e.g., which may have limited processing or power resources as in the case of a cellphone).

Example Implementations

Figure 5:
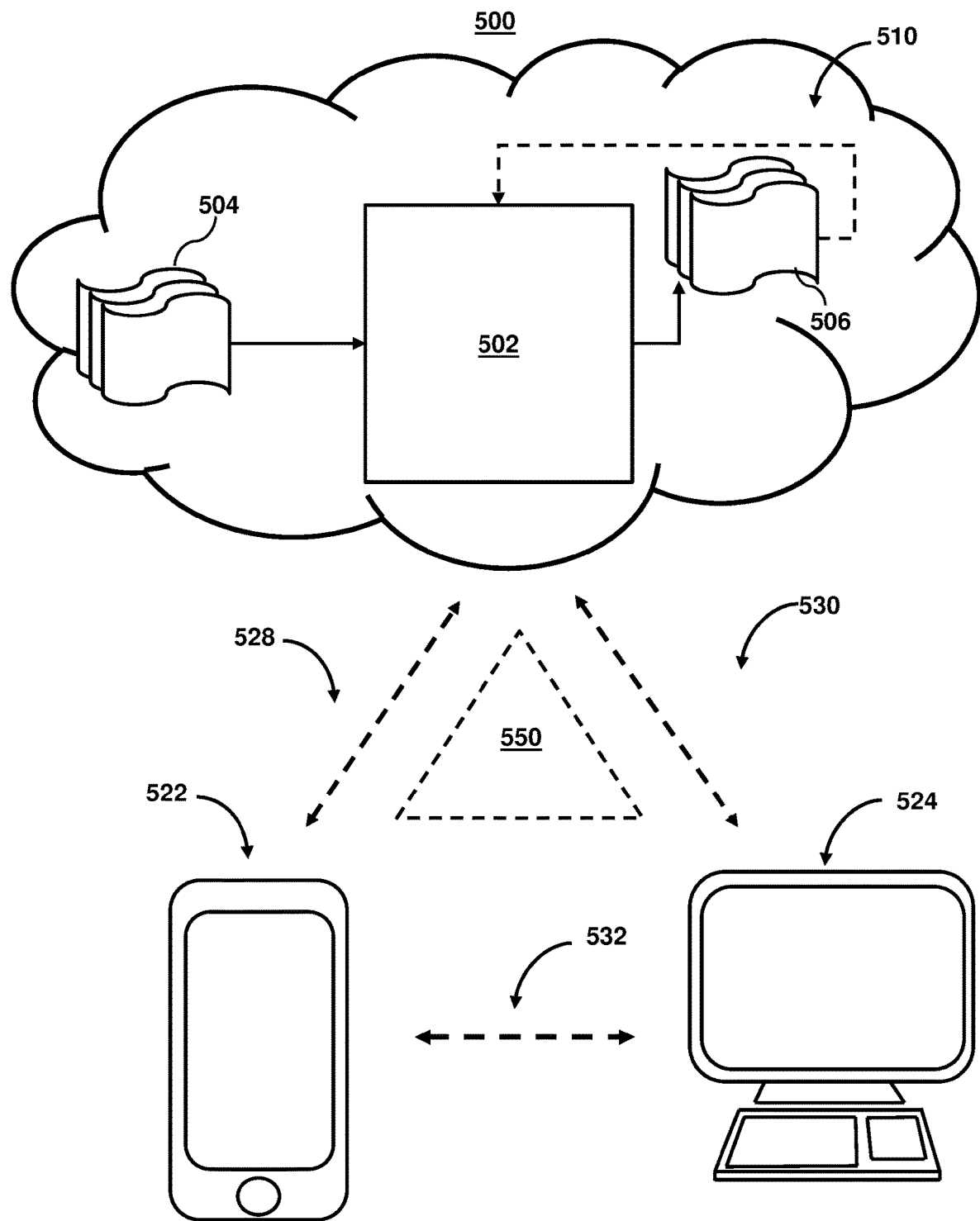
FIG. 5 shows illustrative components for a system used to provide content sharing with spatial-region specific controls, in accordance with one or more embodiments.

FIG. 5 shows illustrative components for a system used to provide content sharing with spatial-region specific controls, in accordance with one or more embodiments. As an example, FIG. 5 may show illustrative components for providing each team working on a different aspect of a product, the portion of a presentation screen that is pertinent to them, thereby minimizing the distraction that may arise from viewing the other portions. As another example, FIG. 5 may show illustrative components for providing one or more students in a classroom, the particular region of a presentation, which was selected by the teacher, that will answer a specific question the student has asked earlier during the presentation.

As shown in FIG. 5, system 500 may include mobile device 522 (e.g., viewing user device) and user terminal 524 (e.g., presenting user device). While shown as a smartphone and personal computer, respectively, in FIG. 5, it should be noted that mobile device 522 and user terminal 524 may be any computing device, including, but not limited to, a laptop computer, a tablet computer, a hand-held computer, and other computer equipment (e.g., a server), including "smart," wireless, wearable, and/or mobile devices. FIG. 5 also includes cloud components 510. Cloud components 510 may alternatively be any computing device as described above, and may include any type of mobile terminal, fixed terminal, or other device. For example, cloud components 510 may be implemented as a cloud computing system, and may feature one or more component devices. It should also be noted that system 500 is not limited to three devices. Users may, for instance, utilize one or more devices to interact with one another, one or more servers, or other components of system 500. It should be noted, that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, both mobile device 522 and user terminal 524 include a display upon which to display data (e.g., conversational response, queries, shared content, and/or notifications).

Additionally, as mobile device 522 and user terminal 524 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, portions of a shared presentation, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include databases that are accessed and used by model 502, and which include a training data database and a model database. For example, these databases can be accessed by one or more subsystems of the presenting user device.

Cloud components 510 may include model 502, which may be a machine learning model, artificial intelligence model, etc. (which may be referred collectively as "models" herein). Model 502 may take inputs 504 and provide outputs

506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., how the auxiliary video stream may be generated to optimize the viewing experience for a particular viewing user device.

In some embodiments, the inputs 504 may include user profiles associated with the users of the viewing user devices, device profiles associated with the viewing user devices, and/or previous or current content the user is looking at or interacting with. As an example, the content the user has been or is looking at may be determined using eye-tracking functionality built into the corresponding viewing user device. As another example, the content may be determined using tracking cookies or HTTP cookies. In some embodiments, the model 502 may use the inputs 504 to determine which spatial region from the set of spatial regions should be selected and transmit this information (as outputs 506) to the presenting user device, e.g., to display subsystem 112 in the presenting user device.

In the example of a product manager presenting several aspects of a project to the different teams working on the project, a user profile may include the specific job title of a viewing user (e.g., software programmer), which can be used to select the spatial region that has information related to software updates. Alternatively, or additionally, the device profile may indicate that the viewing user device is a cellphone, which can be used to optimize or reformat the auxiliary stream that is transmitted to that viewing user. Alternatively, or additionally, if the inputs indicate that the viewing user has been reading pages related to wideband filters or antenna design (e.g., using eye tracking or cookies), then the model 502 can select the spatial region that has information related to radio frequency (RF) design and/or hardware updates. The described embodiments ensure that selected users are presented with content that is applicable to that viewing user.

In the example of the teacher using a presentation in a classroom, a user profile may include the specific assignments completed by a student and their scores/grades on the assignment. Alternatively, or additionally, the device profile may indicate the level of internet connectivity available to the student in their home environment, which may also correlate with their academic progress (e.g., especially during a period of remote learning). The model 502 may select the spatial region of the presentation that has information related to the specific subject matter areas that the student should focus on at a particular time. Alternatively, or additionally, model 502 may select a spatial region of the presentation and transmit it to one or more student viewing devices, and upon determining the efficacy of the content, may then decide to transmit that spatial region (instead of the entire presentation screen) to all the students in the classroom.

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free-flowing, with connections interacting in a more chaotic and complex fashion. During testing, an output layer of model 502 may indicate whether or not a given input corresponds to a classification of model 502 (e.g., which spatial region is selected).

In some embodiments, the model (e.g., model 502) may automatically perform actions based on outputs 506. In some embodiments, the model (e.g., model 502) may not perform any actions. The output of the model (e.g., model 502) may be used to select the spatial region of the set of spatial regions for a particular viewing user.

System 500 also includes API layer 550. API layer 550 may allow the system to generate summaries across different devices. In some embodiments, API layer 550 may be implemented on user device 522 or user terminal 524. Alternatively or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web-services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open source API Platforms and their modules. API layer 550 may use a developer portal. API layer 550 may use strong security constraints applying WAF and DDoS protection, and API layer 550 may use RESTful APIs as standard for external integration.

Example Flowcharts

Figure 6:
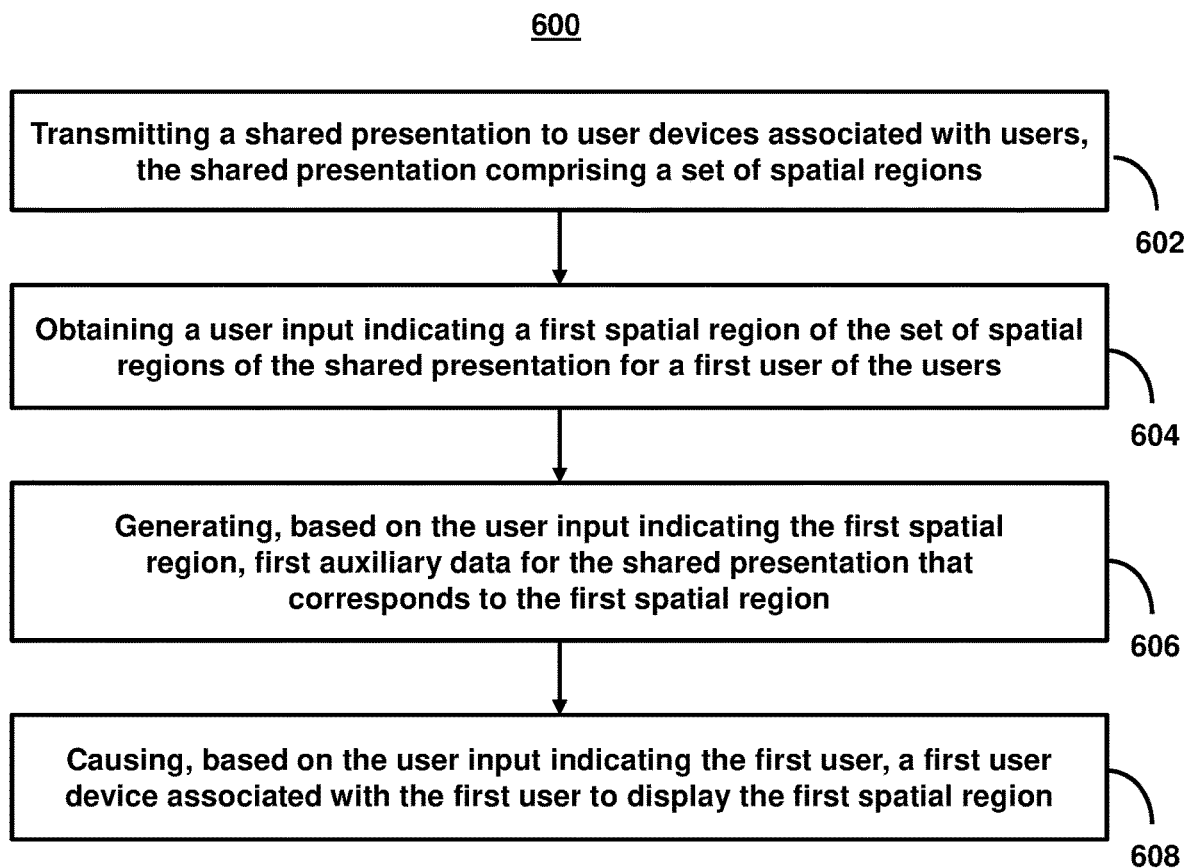
FIG. 6 shows a flowchart of the steps involved in providing content sharing with spatial-region specific controls, in accordance with one or more embodiments.

FIG. 6 shows a flowchart of the steps involved in providing content sharing with spatial-region specific controls, in accordance with one or more embodiments. For example, the system may use process 600 (e.g., as implemented on one or more system components described above) in order to ensure that selected users are presented with content that is applicable to that viewing user.

At step 602, process 600 (e.g., using one or more components described above) transmits a presentation to users. For example, the system may transmit a shared presentation to user devices associated with users. As another example, the shared presentation may be a presentation shared by a presenting user device associated with a presenting user, and the system may transmit, during a video conference call, a video stream of the shared presentation to the user devices. In connection with such transmission, each of the user devices may display a set of spatial regions (e.g., in the form of spatial video regions of the video stream) that collectively form the shared presentation.

At step 604, process 600 (e.g., using one or more components described above) receives an indication of a first spatial region. For example, the system may obtain a user input indicating a first spatial region of the set of spatial regions of the shared presentation for a first user of the users. As another example, the presenting user may select a portion of the screen (e.g., a spatial region) that is most relevant to a particular viewing user.

In some embodiments, the user input leverages the drag-and-drop functionality. For example, the user input comprises moving a first representation of the first user onto the first spatial region. As another example, the first representation is an icon, an email address, or a username associated with the first user, and which can be dragged from a separate or overlaid panel into the determined spatial region.

In some embodiments, the user input can designate (e.g., without using the drag-and-drop functionality) that the first user is to be shown the first spatial region. For example, the user input may include double-clicking on the first representation of the first user and then right-clicking on the first spatial representation and using a context menu to designate the first user to the first spatial region. As another example, the user input may include the first representation of the first user being highlighted (e.g., using a double-click or a right-click), and then the first spatial region being highlighted, with the consecutive highlighting operations indicative of a specific user being assigned a specific spatial region. As yet another example, the user input may include right-clicking within the first spatial region to display a context menu showing the list of user representations and then selecting the first representation of the first user to associate the first user with the first spatial region.

At step 606, process 600 (e.g., using one or more components described above) generates auxiliary data corresponding to the selected spatial region. For example, the system may generate, based on the user input indicating the first spatial region, first auxiliary data for the shared presentation that corresponds to the first spatial region. As another example, the indicated first spatial region can be formatted and encapsulated in a stream in a manner similar to the original video stream. As yet another example, the system may generate decoding instructions for only the indicated first spatial region. By doing so, the system can send only the relevant content portion to the first user.

At step 608, process 600 (e.g., using one or more components described above) causes the first viewing user device to display the selected/indicated spatial region. For example, the system may cause, based on the user input indicating the first user, a first user device associated with the first user to display the first spatial region at a first time without displaying one or more other spatial regions of the set of spatial regions by transmitting the first auxiliary data to the first user device. As another example, the screen on the first user device may be updated from showing the entire presentation screen to only showing the spatial region that was received in the auxiliary video stream. As yet another example, the first user device may be updated (based on the received instructions) from decoding an encoded video stream corresponding to the entire presentation screen to only decoding a portion of the encoded video stream that was selected/indicated (or otherwise avoiding decoding of one or more other portions of the encoded video stream).

In some embodiments, prior to causing the first viewing user device to display the selected spatial region (e.g., without displaying the other spatial regions), personally identifiable information is redacted. For example, prior to causing the first user device associated with the first user to display the first spatial region without displaying the other spatial regions, the system identifies one or more instances of personally identifiable information in the first auxiliary data for the shared presentation, and obscures or removes the instances of the personally identifiable information on the first user device associated with the first user. As another example, the birthdates and home addresses of other software engineers in a particular spatial region may be obscured or removed prior to that spatial region being displayed on the viewing user device of software engineers attending this presentation. By doing so, the system directs the viewing users to relevant information, but the privacy and integrity of personally identifiable information is preserved.

In some embodiments, the personally identifiable information may be obscured or removed. For example, obscuring or removing the instances of the personally identifiable information comprises deleting the instances of the personally identifiable information in the first auxiliary data prior to transmitting the first auxiliary data to the first user device. By doing so, the privacy and integrity of personally identifiable information is preserved.

In some embodiments, the personally identifiable information is replaced by non-alphanumeric characters. For example, obscuring or removing the instances of the personally identifiable information comprises replacing the instances of the personally identifiable information with non-alphanumeric characters in the first auxiliary data prior to transmitting the first auxiliary data to the first user device. As another example, each of the characters of the personally identifiable information can be replaced by one of "!", "@", "#", "$", "%", or "&". By doing so, the formatting of the content (e.g., line indentations, pagination, etc.) in the indicated spatial region is maintained, while preserving the privacy and integrity of personally identifiable information.

In some embodiments, process 600 (e.g., using one or more components described above) indicates, to the first viewing user, which spatial region is being viewed. For example, the system provides an indication of the first spatial region being displayed on the first user device associated with the first user. As another example, a software engineer working on the project receives an indication that only the spatial region focusing on software development is being displayed on the first viewing user device. By doing so, the first viewing user may request another spatial region if the wrong one was inadvertently selected for them.

In some embodiments, process 600 (e.g., using one or more components described above) provides the same auxiliary video stream to one or more users in a multi-viewer session. For example, the system obtains another user input indicating the first spatial region for a second user of the users, and causes, based on the user input indicating the second user, a second user device associated with the second user to display the first spatial region at a second time without displaying the other spatial regions of the set of spatial regions by transmitting the first auxiliary data to the second user device. By doing so, multiple viewing users in the same team can receive the spatial region that is relevant to each member of that team.

In some embodiments, process 600 (e.g., using one or more components described above) provides one or more different auxiliary streams to one or more different users (e.g., as shown in FIG. 4 for client devices 420-2 and 420-3). For example, the system obtains another user input indicating a second spatial region of the set of spatial regions of the shared presentation for a second user of the users, generates, based on the user input indicating the second spatial region, second auxiliary data for the shared presentation that corresponds to the second spatial region, and causes, based on the user input indicating the second user, a second user device associated with the second user to display the second spatial region at a second time without displaying the other spatial regions of the set of spatial regions and at least a portion of the first spatial region by transmitting the second auxiliary data to the second user device. As another example, a first spatial region focused on software development may be encapsulated into a first auxiliary stream, which is sent to each member of the software team, and a second spatial region focused on hardware updates may be encapsulated into a second auxiliary stream, which is sent to each member of the hardware team. By doing so, the system may direct each team member to the particular content portion that is pertinent or relevant to them.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above may be used to perform one or more of the steps in FIG. 6.

In some embodiments, the various computers and subsystems illustrated in FIG. 1 may include one or more computing devices that are programmed to perform the functions described herein. The computing devices may include one or more electronic storages (e.g., conversion database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi™, Bluetooth®, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: transmitting, during the video conference call, a primary video stream of a shared presentation of a presenting device associated with a presenting user to viewing devices associated with viewing users such that each of the viewing devices is caused to display a set of spatial video regions that collectively form the shared presentation; obtaining, from the presenting device, a drag-and-drop input corresponding to the presenting user moving a first viewing user icon representing a first viewing user onto a first spatial video region of the set of spatial video regions of the shared presentation; generating, based on the drag-and-drop input indicating the first spatial video region, a first auxiliary video stream of the shared presentation that corresponds to the first spatial video region such that the first auxiliary video stream does not include other video spatial regions of the set of spatial video regions; and causing, during the video conference call, based on the drag-and-drop input indicating the first viewing user, a first viewing device associated with the first viewing user to display the first auxiliary video stream in lieu of displaying the primary video stream by transmitting the first auxiliary video stream to the first viewing device such that (i) the first viewing device displays the first spatial video region at a first time without displaying the other video spatial regions at the first time and (ii) one or more other viewing devices simultaneously display the first spatial video region and the other video spatial regions at the first time.

2. A method comprising: transmitting a shared presentation to user devices (e.g., viewing devices) associated with users, the shared presentation comprising a set of spatial regions; obtaining a user input indicating a first spatial region of the set of spatial regions of the shared presentation for a first user of the users; generating, based on the user input indicating the first spatial region, first auxiliary data for the shared presentation that corresponds to the first spatial region; and causing, based on the user input indicating the first user, a first user device associated with the first user to display the first spatial region at a first time (e.g., without displaying one or more other spatial regions of the set of spatial regions).

3. The method of the preceding embodiment, wherein transmitting the shared presentation comprises transmitting a presentation stream (e.g., a video stream) of the shared presentation to the user devices (e.g., such that each of the user devices is caused to display the set of spatial regions that collectively form the shared presentation).

4. The method of any of the preceding embodiments, wherein obtaining the user input comprises obtaining the user input from a controlling user device (e.g., a host presenting the shared presentation or other user device controlling the shared presentation), the user input corresponding to the controlling user moving a first representation of the first user of the users onto the first spatial region of the set of spatial regions of the shared presentation.

5. The method of any of the preceding embodiments, further comprising providing, to the controlling user device, an indication of the first spatial region being displayed on the first user device associated with the first user.

6. The method of the preceding embodiment, wherein the indication comprises a bounding box around the first spatial region on a display of the controlling user device.

7. The method of any of the preceding embodiments, wherein causing the first user device to display the first spatial region at the first time comprises transmitting the first auxiliary data to the first user device based on the user input indicating the first user, the transmission of the first auxiliary data causing the first user device to display the first spatial region at the first time.

8. The method of any of the preceding embodiments, the operations further comprising: identifying, prior to causing the first user device associated with the first user to display the first spatial region, one or more instances of personally identifiable information in the first auxiliary data for the shared presentation, and obscuring or removing the one or more instances of the personally identifiable information on the first user device associated with the first user.

9. The method of the preceding embodiment, wherein obscuring or removing the one or more instances of the personally identifiable information comprises deleting the one or more instances of the personally identifiable information in the first auxiliary data prior to transmitting the first auxiliary data to the first user device.

10. The method of embodiment 8, wherein obscuring or removing the one or more instances of the personally identifiable information comprises replacing the one or more instances of the personally identifiable information with non-alphanumeric characters in the first auxiliary data prior to transmitting the first auxiliary data to the first user device.

11. The method of any of the preceding embodiments, wherein the user input comprises moving a first representation of the first user onto the first spatial region.

12. The method of the preceding embodiment, wherein the first representation is an icon, an email address, or a username associated with the first user.

13. The method of any of the preceding embodiments, the operations further comprising: providing an indication of the first spatial region being displayed on the first user device associated with the first user.

14. The method of any of the preceding embodiments, the operations further comprising: obtaining another user input indicating the first spatial region for a second user of the users; and causing, based on the user input indicating the second user, a second user device associated with the second user to display the first spatial region at a second time (e.g., without displaying the one or more other spatial regions of the set of spatial regions).

15. The method of the preceding embodiment, wherein causing the second user device to display the first spatial region at the second time comprises transmitting the first auxiliary data to the second user device based on the other user input indicating the second user, the transmission of the first auxiliary data causing the second user device to display the first spatial region at the second time.

16. The method of any of the preceding embodiments, the operations further comprising: obtaining another user input indicating a second spatial region of the set of spatial regions of the shared presentation for a second user of the users; generating, based on the user input indicating the second spatial region, second auxiliary data for the shared presentation that corresponds to the second spatial region; and causing, based on the user input indicating the second user, a second user device associated with the second user to display the second spatial region at a second time (e.g., without displaying one or more other spatial regions of the set of spatial regions, without displaying at least a portion of the first spatial region, etc.).

17. The method of the preceding embodiment, wherein causing the second user device to display the second spatial region at the second time comprises transmitting the second auxiliary data to the second user device based on the other user input indicating the second user, the transmission of the second auxiliary data causing the second user device to display the second spatial region at the second time.

18. The method of any of the preceding embodiments, wherein the first auxiliary data comprises a first auxiliary video stream transmitted to the first user device.

19. The method of any of the preceding embodiments, wherein the first auxiliary data comprises instructions for the first user device to display the first spatial region at the first time without displaying the other spatial regions at the first time.

20. A tangible, non-transitory, machine-readable medium storing instructions that, when executed by a data processing apparatus, cause the data processing apparatus to perform operations comprising those of any of the foregoing method embodiments.

21. A system comprising: one or more processors; and memory storing instructions that, when executed by the processors, cause the processors to effectuate operations comprising those of any of the foregoing method embodiments.

What is claimed is:

1. A method comprising:
transmitting a presentation stream of a shared presentation to a plurality of user devices associated with users;
causing, based on the transmission of the presentation stream, display of a set of spatial regions on each user device of the plurality of user devices displays, wherein the set of spatial regions includes at least two spatial regions that collectively form the shared presentation, and all spatial regions of the set of spatial regions are simultaneously displayed via the transmission of the presentation stream, and wherein each spatial region of the set of spatial regions displays video data different from video data of other ones of the set of spatial regions;
obtaining, from a controlling user device, separate from the plurality of user devices, a user input corresponding to a controlling user designating a first representation of a first user of the users within a first spatial region of the at least two spatial regions of the set of spatial regions of the shared presentation;
generating, based on the user input designating the first representation of the first user, first auxiliary data for the shared presentation that corresponds to the first spatial region, wherein the first auxiliary data includes data for displaying the first spatial region and does not include data for displaying other spatial regions of the set of spatial regions;
transmitting the first auxiliary data to a first user device associated with the first user at a first time without transmitting the presentation stream to the first user device at the first time; and
causing, based on the transmission of the first auxiliary data to the first user device, display of an auxiliary presentation stream of the shared presentation including on the first user device, the auxiliary presentation stream including the first spatial region and not including the other spatial regions of the set of spatial regions, in lieu of displaying the set of spatial regions of the shared presentation, wherein, at the first time, one or more other user devices of the plurality of user devices continue to display the set of spatial regions forming the shared presentation via the transmission of the presentation stream of the shared presentation while the first user device displays the first spatial region via the transmission of the first auxiliary data without the first user device displaying the other spatial regions of the set of spatial regions.

2. The method of claim 1, further comprising:
identifying, prior to causing the first user device to display the first spatial region, one or more instances of personally identifiable information in the first auxiliary data for the shared presentation; and
obscuring or removing the one or more instances of the personally identifiable information on the first user device associated with the first user.

3. The method of claim 2, wherein the obscuring or removing comprises:
deleting at least one of the one or more instances of the personally identifiable information in the first auxiliary data prior to transmitting the first auxiliary data to the first user device.

4. The method of claim 2, wherein the obscuring or removing comprises:
replacing at least one of the one or more instances of the personally identifiable information with non-alphanumeric characters in the first auxiliary data prior to transmitting the first auxiliary data to the first user device.

5. The method of claim 1, wherein the first representation is an icon, an email address, or a username associated with the first user.

6. The method of claim 1, further comprising:
providing, to the controlling user device, an indication of the first spatial region being displayed on the first user device associated with the first user, wherein the indication comprises a bounding box around the first spatial region on a display of the controlling user device.

7. The method of claim 1, further comprising:
obtaining, from the controlling user device, another user input corresponding to the controlling user designating a second representation of a second user of the users onto the first spatial region of the set of spatial regions of the shared presentation; and
causing, based on the user input designating the second representation of the second user, a second user device associated with the second user to display the auxiliary presentation stream of the shared presentation including the first spatial region in lieu of displaying the set of spatial regions of the shared presentation by transmitting the first auxiliary data to the second user device.

8. The method of claim 1, further comprising:
obtaining, from the controlling user device, another user input corresponding to the controlling user moving a second representation of a second user of the users onto a second spatial region of the set of spatial regions of the shared presentation;
generating, based on the user input indicating the second spatial region, second auxiliary data for the shared presentation that corresponds to the second spatial region; and
causing, based on the user input indicating the second user, a second user device associated with the second user to display another auxiliary presentation stream of the shared presentation including the second spatial region in lieu of displaying the set of spatial regions of the shared presentation by transmitting the second auxiliary data to the second user device.

9. The method of claim 1, wherein the first auxiliary data is transmitted to the first user device using the same or fewer resources than used to transmit the presentation stream to the first user device.

10. The method of claim 1, wherein presentation stream comprises an encoded presentation stream, causing the first user device to display the auxiliary presentation stream of the shared presentation including the first spatial region in lieu of displaying the set of spatial regions of the shared presentation comprises:
causing the first user device to decode a portion of the encoded presentation stream corresponding to the first spatial region in lieu of decoding one or more other portions of the encoded presentation stream corresponding to the set of spatial regions.

11. One or more non-transitory computer-readable media comprising instructions that, when executed by one or more processors, cause operations comprising:
transmitting a presentation stream of a shared presentation to a plurality of user devices associated with users;
causing, based on the transmission of the presentation stream, display of a set of spatial regions on each user device of the plurality of user devices, wherein the set of spatial regions includes at least two spatial regions that collectively form the shared presentation, and all spatial regions of the set of spatial regions are simultaneously displayed via the transmission of the presentation stream, and wherein each spatial region of the set of spatial regions displays video data different from video data of other ones of the set of spatial regions;
obtaining, from a controlling user device, separate from the plurality of user devices, a user input corresponding to a controlling user designating a first representation of a first user of the users within a first spatial region of the at least two spatial regions of the set of spatial regions of the shared presentation;
generating, based on the user input designating the first representation of the first user, first auxiliary data for the shared presentation that corresponds to the first spatial region, wherein the first auxiliary data includes data for displaying the first spatial region and does not include data for displaying other spatial regions of the set of spatial regions;
transmitting the first auxiliary data to a first user device associated with the first user at a first time without transmitting the presentation stream to the first user device at the first time; and
causing, based on the transmission of the first auxiliary data to the first user device, display of an auxiliary presentation stream of the shared presentation on the first user device, the auxiliary data stream including the first spatial region at a first time and not including the other spatial regions of the set of spatial regions, in lieu of displaying the set of spatial regions of the shared presentation, wherein, at the first time, one or more other user devices of the plurality of user devices continue to display the set of spatial regions forming the shared presentation via the transmission of the presentation stream of the shared presentation while the first user device displays the first spatial region via the transmission of the first auxiliary data without the first user device displaying the other spatial regions of the set of spatial regions.

12. The one or more non-transitory computer-readable media of claim 11, wherein the operations further comprise:
identifying, prior to causing the first user device associated with the first user to display the first spatial region in lieu of displaying the set of spatial regions of the shared presentation, one or more instances of personally identifiable information in the first auxiliary data for the shared presentation; and
obscuring or removing the one or more instances of the personally identifiable information on the first user device associated with the first user.

13. The one or more non-transitory computer-readable media of claim 12, wherein the obscuring or removing the one or more instances of the personally identifiable information comprises:
deleting at least one of the one or more instances of the personally identifiable information in the first auxiliary data prior to transmitting the first auxiliary data to the first user device.

14. The one or more non-transitory computer-readable media of claim 12, wherein the obscuring and removing the one or more instances of the personally identifiable information comprises:
replacing at least one of the one or more instances of the personally identifiable information with non-alphanumeric characters in the first auxiliary data prior to transmitting the first auxiliary data to the first user device.

15. The one or more non-transitory computer-readable media of claim 11, wherein the user input comprises moving a first representation of the first user onto the first spatial region.

16. The one or more non-transitory computer-readable media of claim 15, wherein the first representation is an icon, an email address, or a username associated with the first user.

17. The one or more non-transitory computer-readable media of claim 11, wherein the operations further comprise:
providing an indication of the first spatial region being displayed on the first user device associated with the first user.

18. The one or more non-transitory computer-readable media of claim 11, wherein the operations further comprise:
obtaining another user input indicating the first spatial region for a second user of the users; and
causing, based on the user input indicating the second user, a second user device associated with the second user to display the first spatial region in lieu of displaying the set of spatial regions of the shared presentation by transmitting the first auxiliary data to the second user device.

19. The one or more non-transitory computer-readable media of claim 11, wherein the operations further comprise:
obtaining another user input indicating a second spatial region of the set of spatial regions of the shared presentation for a second user of the users;
generating, based on the user input indicating the second spatial region, second auxiliary data for the shared presentation that corresponds to the second spatial region; and
causing, based on the user input indicating the second user, a second user device associated with the second user to display the second spatial region in lieu of displaying the set of spatial regions of the shared presentation by transmitting the second auxiliary data to the second user device.

20. A system for facilitating spatial-region-specific controls during content sharing, the system comprising:
a controlling user device associated with a controlling user;
a plurality of user devices associated with a plurality of users; and
a computer system comprising one or more processors programmed with computer program instructions to:
transmit a presentation stream of a shared presentation to the plurality of user devices;
cause, based on the transmission of the presentation stream, display of a set of spatial regions on each user device of the plurality of user devices, wherein the set of spatial regions includes at least two spatial regions that collectively form the shared presentation, and all spatial regions of the set of spatial regions are simultaneously displayed via the transmission of the presentation stream, and wherein each spatial region of the set of spatial regions displays video data different from video data of other ones of the set of spatial regions;
obtain, from the controlling user device, a user input corresponding to the controlling user designating a first representation of a first user of the plurality of users within a first spatial region of the at least two spatial regions of the set of spatial regions of the shared presentation;
generate, based on the user input designating the first representation of the first user, first auxiliary data for the shared presentation that corresponds to the first spatial region, wherein the first auxiliary data includes data for displaying the first spatial region and does not include data for displaying other spatial regions of the set of spatial regions;
transmit the first auxiliary data to a first user device associated with the first user at a first time without transmitting the presentation stream to the first user device at the first time; and
cause, based on the transmission of the first auxiliary data to the first user device, display of an auxiliary presentation stream of the shared presentation on the first user device, the auxiliary presentation stream including the first spatial region and not including the other spatial regions of the set of spatial regions, in lieu of displaying the set of spatial regions of the shared presentation, wherein, at the first time, one or more other user devices of the plurality of user devices continue to display the set of spatial regions forming the shared presentation via the transmission of the presentation stream of the shared presentation while the first user device displays the first spatial region via the transmission of the first auxiliary data without the first user device displaying the other spatial regions of the set of spatial regions.

* * * * *